Patented July 7, 1942

2,289,280

UNITED STATES PATENT OFFICE 2,289,280

VAT DYESTUFF

Franz Wieners, Cologne-Stammheim, and Walter Mieg, Opladen, Germany, assignors to General Aniline & Film Corporation, a corporation of Delaware No Drawing. Application August 9, 1939, Serial No. 289,175. In Germany August 22, 1938

1 Claim. (Cl. 260—316)

This invention relates to new and valuable vat dyestuffs.

We have found that new and valuable vat dyestuffs may be prepared by treating with acid condensing agents compounds containing at least once the atomic grouping —NH—arylene—CO—NH— the nitrogen atoms of which are linked with vattable radicals, at least one o-position with respect to the secondary amino group being unsubstituted in both the arylene and vattable radical. As starting materials there are preferably employed compounds which contain the above-indicated grouping once and in which the nitrogen atoms are linked with vattable p-quinoidic radicals containing at least 3 condensed rings, especially radicals derived from an anthraquinone which may be substituted by acyl groups, for instance benzoylamino groups. Compounds containing other radicals, for instance of the type of anthanthrone or dibenzanthrone, are not to be excluded. The vat radicals may also be anthrimide carbazole or anthrimide radicals. In the latter case carbazolization occurs during the reaction and the corresponding anthrimide carbazole is formed. It is to be pointed out that valuable dyestuffs are also obtained when one starts from compounds containing the above grouping twice.

The arylene radical may be a phenylene or naphthylene radical. When compounds are employed containing the phenylene radical especially good results are obtained if the secondary amino group is in o-position to the carbonamide group. The arylene may be substituted for instance by halogen or alkyl groups.

Aluminum halides—for instance, aluminum chloride—are suitable as acid-condensing agents, especially when used in the presence of nitrobenzene, sulfurous acid, acid chlorides or acid nitriles. Other acid condensing agents, for instance concentrated sulfuric acid, are also useful.

Our new dyestuffs represent probably compounds of the carbazole type. They are vat dyestuffs of excellent fastness properties, which yield, depending upon the substituents in the starting materials employed, shades varying between a clear yellow and brown to olive. They are especially valuable for the reason that they may be dyed from a warm or even hot vat.

The following examples illustrate the invention without, however, restricting it thereto, the parts being by weight:

*Example 1*

1 - benzoylamino - 4 - aminoanthraquinone is acylated with 1 mol of o-chloro-benzoyl chloride and the chloro atom in the phenyl nucleus replaced by condensation with a further mol of 1-benzoylamino-4-aminoanthraquinone in the presence of boiling naphthalene, sodium carbonate, copper powder. The substance represents, if necessary after crystallization from chlorobenzene, currant colored needles which dissolve in concentrated sulfuric acid with an olive color.

7 parts of this product of the formula

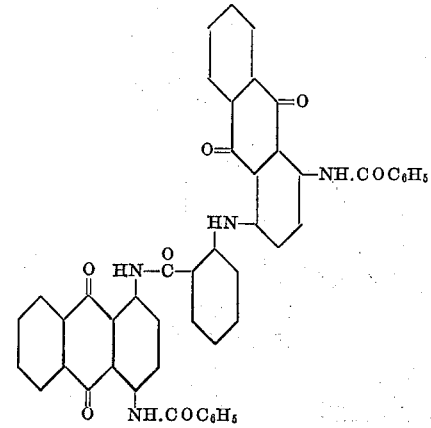

are added at a temperature of about 35° C. to a solution of 16 parts of anhydrous aluminium chloride in 30 parts of nitrobenzene. After stirring for a short time the condensation is finished. The reaction mixture is worked up preferably by adding small amounts of chlorine lye and such an amount of sodium hydroxide solution that a strong alkaline reaction is reached. The nitrobenzene is removed by means of water vapor. The product which has been freed from nitrobenzene, the aluminium salts etc. dyes cotton from a red-brown vat, brown-red shades of excellent fastness properties. The solution of the dyestuff in concentrated sulfuric acid is currant-colored. When the solution is poured into water red-brown flakes are obtained.

When the condensation is effected with the liquid obtained by passing sulfurous acid into aluminium chloride or aluminium chloride-sodium chloride a product with similar properties is obtained.

*Example 2*

When 1-(o-chloro)-benzoylamino - 4 - benzoylaminoanthraquinone is condensed with 1 mol of 1-benzoylamino-5-aminoanthraquinone as indicated in Example 1 red needles are obtained which dissolve in concentrated sulfuric acid with a red color.

60 parts of the product are added to a solution of 75 parts of aluminum chloride in 200 parts of nitrobenzene the temperature being maintained between 20-30° C. The condensation is completely finished after stirring for 1-2 hours. 10 parts of anhydrous sodium nitrite are added to the melt and the melt poured, after about 30 minutes, into ice-water. Then small amounts of chlorine lye and such an amount of sodium hydroxide solution are added as necessary for dissolving aluminium.

The nitrobenzene is then removed with water vapor and the dyestuff sucked off and washed. For increasing the clearness the dyestuff may be treated in dilute sulfuric acid at about 80–90° C. with small amounts of sodium bichromate. It represents a very strong vat, dyestuff which dyes cotton from a red-brown vat clear reddish-orange shades of excellent fastness properties. It dissolves in concentrated sulfuric acid with a bluish-green color.

The dyestuff has probably the following constitution:

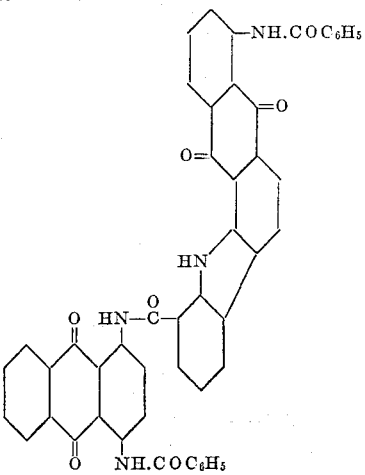

*Example 3*

1 part of the compound obtained in a manner analogous to that of Example 2 and having the following formula

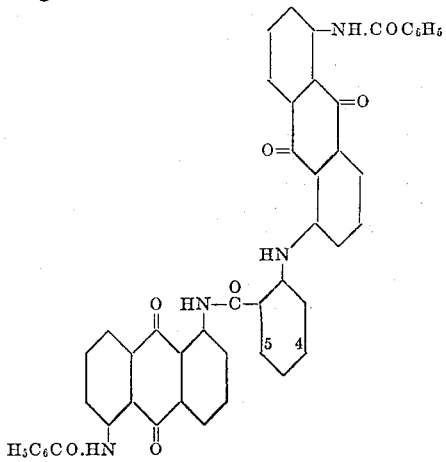

is stirred for a short time at 40–45° C. in a solution of 3 parts of anhydrous aluminium chloride in 6 parts of nitrobenzene. A vat dyestuff is obtained which dyes cotton from a red-brown vat clear golden-yellow shades of excellent fastness properties. It dissolves in concentrated sulfuric acid with a greenish-blue color. When the solution is poured into water, golden-yellow flakes separate.

Similar dyestuffs which dye in a more greenish shade are obtained when one starts from compounds containing a chlorine atom in the 4- or 5-position of the above formula.

*Example 4*

4 parts of the product obtained by condensation of 1 mol of 1-(o-chloro)-benzoylamino-5-benzoylaminoanthraquinone with 1 mol of 5-amino-1.9-(Bz$_1$-Bz$_3$-diaza)-benzanthrone which has been purified by extraction with boiling quinoline are added to a solution of 15 parts of aluminium chloride in 30 parts of anhydrous nitrobenzene at a temperature of between 30–40° C. The mixture is stirred at a temperature of 30° C. until a test portion which has been worked up dissolves in sulfuric acid with a dull bordo-red color. Then the melt is poured into ice-water and sodium hydroxide solution is added until a strong alkaline reaction is reached and after small amounts of chlorine lye have been added the whole distilled with water vapor. When the nitrobenzene has been removed the dyestuff is sucked off and, if necessary, treated in sulfuric acid suspension with bichromate at 80–100° C., sucked off again and washed until neutral.

The dyestuff paste dyes cotton from a hot red-brown vat fast yellowish-brown shades. It corresponds probably to the following formula

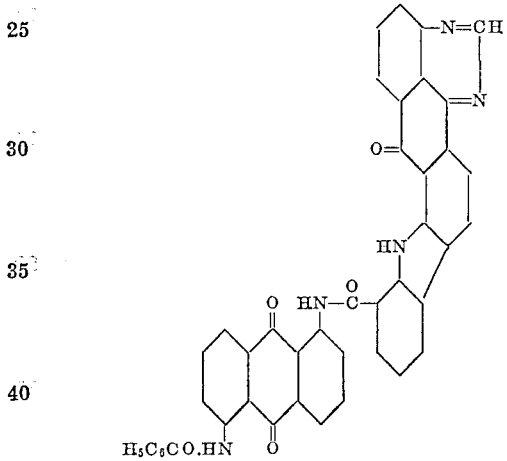

and dissolves in concentrated sulfuric acid with a bordo-red color.

*Example 5*

1 mol of 1-(2'4'-dichloro)-benzoylamino-4-chloroanthraquinone is caused to react with 2 mols of 1-benzoylamino-5-aminoanthraquinone in naphthalene similar to the anthrimide melt. A crystallized red product is obtained in a good yield which corresponds probably to the following formula

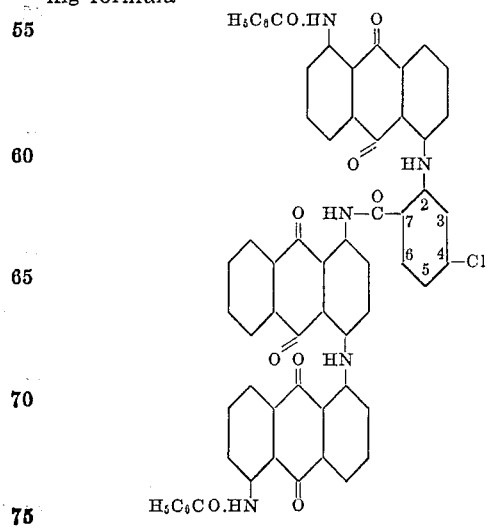

When this compound is dissolved in concentrated sulfuric acid it is changed and a brown vat dyestuff is obtained which dissolves in concentrated sulfuric acid with a red color. Probably only the anthrimide has been carbazolized.

Another brown vat dyestuff is obtained containing probably two carbazole nuclei when the product of the above formula is treated with aluminium chloride in the following manner:

60 parts of anhydrous aluminium chloride and 12 parts of sodium chloride are treated with gaseous sulfurous acid until a liquid mass is obtained. Then 15 parts of the above mentioned starting material are added in a finely powdered state at a temperature of 50–60° C. and the whole heated while stirring until a test portion when worked up indicates no further change. In this case 1½ hours at a temperature of about 70° C. are necessary. The melt is decomposed by pouring into a mixture of ice and sodium hydroxide solution. The precipitated product is filtered with suction and treated in dilute sulfuric acid suspension at 80–90° C. with bichromate until the reddish-brown shade which soon appears shows no further change. Then the product is filtered with suction and washed neutral with water. The paste obtained may be used directly for vatting and dyeing. The product dyes cotton from a warm or hot vat very fast reddish-brown shades. It dissolves in concentrated sulfuric acid with a blue color.

*Example 6*

This example corresponds to Example 5, instead of 1-(2'4')-dichlorobenzoylamino-4-chloroanthraquinone, however, 1-(2'5')-dichlorobenzoylamino-4-chloroanthraquinone is used. The dyestuff obtained is a fast red-brown. It dissolves in concentrated sulfuric acid with a reddish-blue color.

When as starting material a compound is employed which is analogous to the starting material of Example 5 which however, does however, not contain the chlorine atom in the substituted benzoylamino group, then by a treatment with aluminium chloride-sulfurous acid a more yellowish brown vat dyestuff is obtained which dissolves in concentrated sulfuric acid violet-blue.

*Example 7*

1-(3- chlorobenzoylamino) - 5-benzoylaminoanthraquinone is condensed with 1-amino-5-benzoylaminoanthraquinone to the compound of the formula

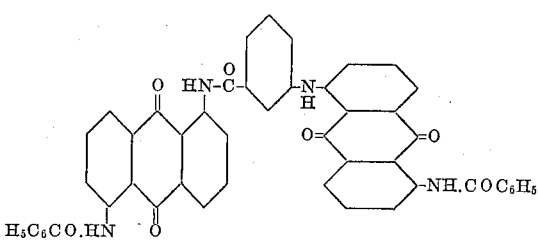

1 part of this condensation product is converted into a strong yellowish-brown vat dyestuff by heating it in a melt consisting of 4 parts of aluminium chloride and 10 parts of nitrobenzene. It may be separated from the melt according to the statement of Example 2. The color of the vat is bordo-red. It dissolves in concentrated sulfuric acid with a dark greenish-blue color.

When the condensation product from 1-(3-chlorobenzoylamino) - 4-benzoylaminoanthraquinone and 1-amino-5-benzoylaminoanthraquinone is employed a product is obtained which dyes cotton from a bordo-red vat fast red-brown shades. It dissolves in concentrated sulfuric acid with a greenish-blue color.

*Example 8*

1-(o-chloro)-benzoylaminoanthraquinone is condensed with 1-benzoylamino-5-aminoanthraquinone in boiling naphthalene in the presence of an alkali acetate and copper acetate to the starting material of the following formula

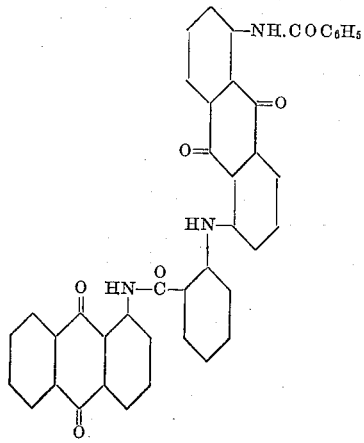

5 parts of this compound are dissolved at a temperature of 40° C. in the mixture consisting of 25 parts of aluminium chloride and 5 parts of sodium chloride which is liquefied by sulfurous acid. It is stirred whereby the temperature increases until a test portion when worked up turns yellow. Then the melt is poured into ice water which contains the necessary amount of sodium hydroxide solution for binding the aluminium and the acids. Small amounts of sodium hypochlorite solution are added to the stirred mixture at 70° C. as long as the product turns clearer. The separated dyestuff represents a yellowish-brown powder which dissolves in concentrated sulfuric acid with a blue color and dyes cotton from a red-brown hydrosulfite vat very fast golden-yellow shades.

When the condensation is effected by means of aluminium chloride in the presence of nitrobenzene a dyestuff of the same properties is obtained. When a chlorine atom is present in the phenylene nucleus in p-position to the nitrogen atom a dyestuff with about the same properties except that it is a little more greenish is obtained.

*Example 9*

When the starting material used as a condensation product obtained by replacing the 1-(o-chloro)-benzoylaminoanthraquinone of Example 8 by the 1-(m-chloro)-benzoylaminoanthraquinone or the corresponding p-derivative and the same method of working up is employed dyestuffs are obtained which dissolve in concentrated sulfuric acid with a turquoise blue or bluish-green color respectively and which dye cotton from the warm red-brown hydrosulfite vat very fast yellow to yellow-brown shades.

Condensation may also be effected with aluminium chloride in nitrobenzene instead of aluminium chloride-sulfurous acid.

*Example 10*

4.4′-diamino-1.1′-dianthrimide is acylated with 2 mols of o-chloro-benzoyl chloride. The diacylated product thus obtained is condensed with 2 mols of 1-amino-5-benzoylaminoanthraquinone in naphthalene in the presence of potassium acetate and copper salts 2 mols of hydrochloric acid being split off.

8 parts of this product are heated for 1 hour at a temperature of 60–65° C. in a mixture consisting of 80 parts of nitrobenzene and 35 parts of aluminium chloride. When worked up a khaki-colored vat dyestuff is obtained yielding a red-brown vat and dissolving in concentrated sulfuric acid with a deep bluish-green color.

*Example 11*

5 parts of the same starting material as in Example 3 are added at a temperature of 20–30° C. to a solution of 15 parts of anhydrous aluminium chloride in 30 parts of benzoyl chloride. It is stirred for a short time at 20–30° C. and the melt decomposed by stirring with water; to which some sodium nitrite has been added. The whole is heated to boiling to dissolve the benzoic acid obtained from the benzoyl chloride by saponification, filtered with suction and the filter cake washed with hot water. The residue is stirred with dilute sodium hydroxide solution and vatted by adding sodium hydrosulfite. If necessary the solution is filtered, the dyestuff precipitated by passing in air and subsequently the dyestuff treated with sodium hypochlorite solution at about 60–80° C. The product dissolves in concentrated sulfuric acid with a bluish-green color and corresponds essentially to the product obtained according to Example 3.

*Example 12*

6 parts of the condensation product obtained from 1 mol of 1-amino-5-benzoylaminoanthraquinone and 1-benzoylamino-4-(2′-chloro-3′-naphthoyl)-aminoanthraquinone are introduced at a temperature of 0–5° C. into 100 parts of 98% sulfuric acid. After a short time the product has been changed completely. When no starting material can be detected 1 part of sodium nitrite is added in small portions and the green solution poured after a few minutes into ice-water. Small amounts of sodium dichromate are added until it is no longer used up. The dyestuff is filtered with suction and the paste washed neutral.

It dyes cotton from a bordo-red vat strong very fast reddish-brown shades.

*Example 13* o-Bromo-benzoylaminoanthanthrone (obtained from anthanthrone by mononitration, reduction and acylation) is condensed in naphthalene with 1-amino-5-benzoylaminoanthraquinone in the presence of sodium carbonate and a copper compound. Brownish needles are obtained which dissolve in concentrated sulfuric acid with a green color.

40 parts of the condensation product are added to a solution of 150 parts of aluminium chloride in 300 parts of nitrobenzene at a temperature of 25–30° C. The whole is kept about 40 minutes at 35° C., 8 parts of sodium nitrite are added in portions and the mixture stirred for half an hour. Then the melt is stirred into cold dilute sodium hydroxide solution and the nitrobenzene removed with water vapor. The dyestuff is filtered with suction and again warmed at 80° C. in dilute sulfuric acid with small amounts of dichromate. Then it is filtered with suction and washed. The obtained paste of the dyestuff may be used as such for dyeing purposes.

Very fast brownish-orange shades are obtained from a crimson-red vat. The solution in concentrated sulfuric acid is blue.

*Example 14*

A very fast red-brown vat dyestuff is obtained when the condensation product from 1 mol of o-bromo-benzoylaminoanthanthrone and 1 mol of 1-amino-4-benzoylaminoanthraquinone is employed. Also in this case condensation may be effected easily with concentrated sulfuric acid. The dyestuff dissolves in concentrated sulfuric acid with a green color. When the solution is poured into water a brick-red suspension is obtained.

*Example 15*

The acylation product of 5-amino-1.9-anthrapyrimidine with o-chloro-benzoyl chloride is condensed in the naphthalene in usual manner with 1-amino-5-benzoylaminoanthraquinone. 30 parts of this product which crystallizes in brownish-red needles and has the following formula

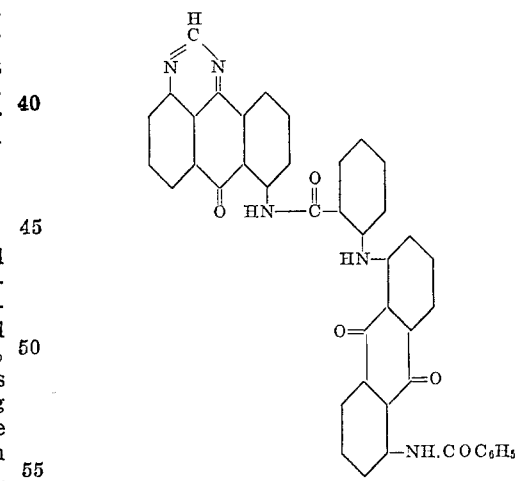

are added to a solution of 100 parts of sublimed aluminium chloride in 200 parts of nitrobenzene and stirred for 1 hour at 45° C. Then 3.5 parts of sodium nitrite are added in portions, stirred for a short time and the melt acid or alkaline decomposed with water and worked up as usual. Suitably the paste is treated with acid or alkaline oxidizing agents by which treatment a somewhat increased clearness of shade is obtained.

The dyestuff thus obtained dyes from a hot red-brown vat very fast brownish-yellow shades. Its solution in concentrated sulfuric acid is greenish-blue.

*Example 16*

1-(o-chlorobenzoyl)-amino-5-(2′-naphthyl)-aminoanthraquinone is condensed in naphthalene with 1-amino-5-β-benzoyl-amino-anthraquinone in the presence of an acid binding agent and some copper powder to the intermediate product of the following formula

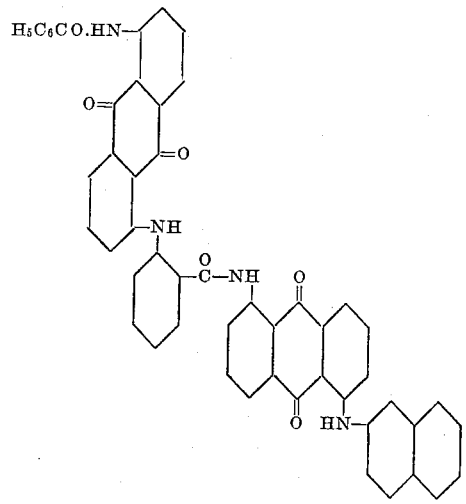

4 parts of this product are introduced while stirring into a solution of 16 parts of aluminium chloride in 35 parts of nitrobenzene. The temperature is increased within 1 hour up to 55° C. and then the melt decomposed with ice-cold sodium hydroxide solution. After removing the nitrobenzene with water vapor the whole is stirred for about 1 hour in the presence of chlorine-lye, the dyestuff subsequently separated and converted into a paste suited for dyeing purposes.

The solution in concentrated sulfuric acid is blue.

*Example 17*

The chlorine atom in the orange dyestuff of the following formula

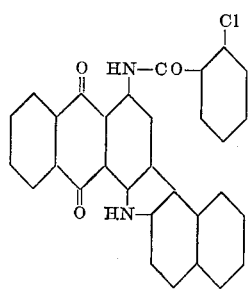

is replaced in the usual manner by the 1-amino-5-benzoylamino-anthraquinone radical.

30 parts of this intermediate product are added to a solution of 90 parts of aluminium chloride in 180 parts of nitrobenzene and the mixture stirred for about 1 hour at 40° C. Then 10 parts of sodium nitrite are stirred into the mixture, the melt introduced in excess sodium hydroxide solution and the nitrobenzene removed with water vapor. The remaining dyestuff is filtered, washed and preferably treated in sulfuric acid suspension at about 80° C. with dichromate, again separated and dried. The dark brown powder obtained dissolves in concentrated sulfuric acid with a greenish-blue color. When the solution is poured into water, the dyestuff filtered and washed neutral with water a brown dye-paste is obtained which yields a red-brown vat with sodium hydrosulfite and sodium hydroxide solution. Cotton is dyed in very fast red-brown shades.

*Example 18*

1 mol of 1.5-di-(2-chlorobenzoylamino)-anthraquinone is condensed with 2 mols of 1-amino-5-benzoylaminoanthraquinone by heating in naphthalene in the presence of an alkali acetate and small amounts of copper salt, 2 mols of hydrochloric acid being split off. The intermediate product corresponds to the following formula

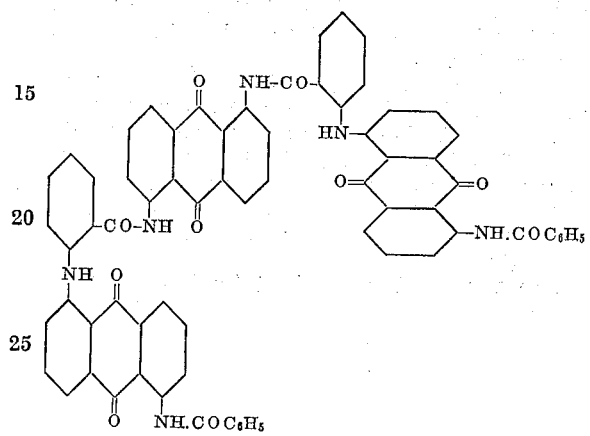

10 parts of this compound are heated in a mixture of 100 parts of nitrobenzene and 44 parts of aluminium chloride for about 1 hour at a temperature of 65-70° C. The mixture is allowed to cool and at 30° C., 3 parts of sodium nitrite are added. For working up the reaction product may be, for instance, stirred into glacial acetic acid and the precipitate filtered after weakly warming, washed with acetic acid and boiled out with dilute hydrochloric acid. The dyestuff thus obtained may be revatted in order to obtain a clearer shade or boiled out with a high boiling solvent and then warmed in a strong sulfuric acid paste with the addition of bichromate at 80-100° C. A dyestuff is obtained which dyes cotton clear golden-orange shades of very good fastness properties. It dissolves in concentrated sulfuric acid with a deep blue color. Its alkaline hydrosulfite vat is red-brown.

A vat dyestuff is obtained which dyes cotton from a red-brown vat strong reddish-brown shades of similar good fastness properties when the condensation product employed is derived from 1 mol of 1.5-di-(2-chloro-benzoylamino)-anthraquinone and 2 mols of 1-amino-4-benzoylaminoanthraquinone. It dissolves in concentrated sulfuric acid with a brownish-red color.

*Example 19*

The compound obtained by condensation of 1 mol of 1.4-di-(2-chloro-benzoylamino)-anthraquinone with 2 mols of 1-amino-5-benzoylaminoanthraquinone, 2 mols of hydrogen chloride being split off, is treated in a manner analogous to that of Example 18 with aluminium chloride in a solution of nitrobenzene. A very fast brown-orange dyestuff is obtained, the vat dye of which is red-brown. It dissolves in concentrated sulfuric acid with a bluish-green color. When the condensation product of 1 mol of 1.4-di-(2-chloro-benzoylamino)-anthraquinone with 2 mols of 1-amino-4-benzoylaminoanthraquinone is employed a red-brown dyeing vat dyestuff is obtained. Its vat dye is red-brown and its solution in concentrated sulfuric acid is brownish-red.

*Example 20*

When in the manufacture of the starting material according to Example 15 the 5-amino-1.9-anthrapyrimidine is replaced by the equivalent amount of 4-amino-1.9-anthrapyrimidine an isomeric product is obtained which crystallizes from nitrobenzene in brownish-red needles and which dissolves in concentrated sulfuric acid with an orange color.

When 30 parts of this product are treated with aluminium chloride, dissolved in nitrobenzene, a vat dyestuff is obtained in a very good yield, said dyestuff dyeing cotton from a hot red-brown vat very fast yellow shades. Contrary to the starting material the dyestuff dissolves in concentrated sulfuric acid with a red-blue color.

We claim:

The vat dyestuff obtained by treating with aluminium chloride the compound of the following formula

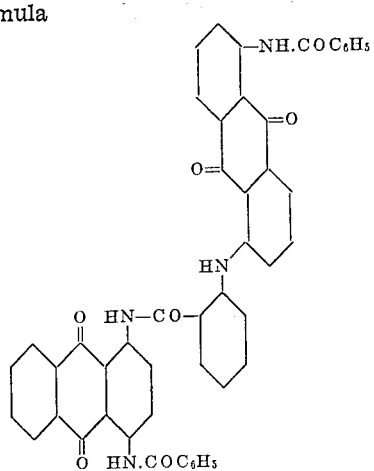

FRANZ WIENERS.
WALTER MIEG.